No. 856,209. PATENTED JUNE 11, 1907.
H. BARTHEL.
BALL BEARING.
APPLICATION FILED JAN. 2, 1907.
FIG.1. 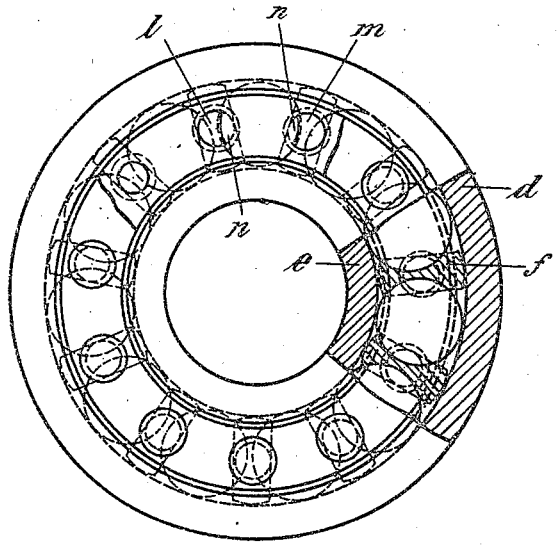 FIG.2. 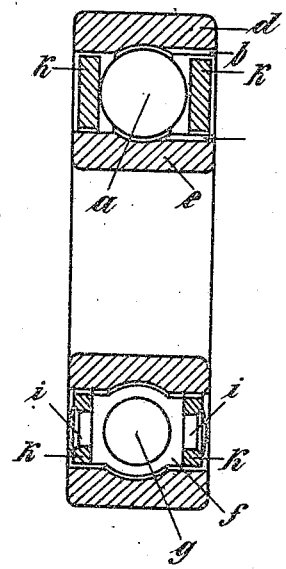
FIG.3. 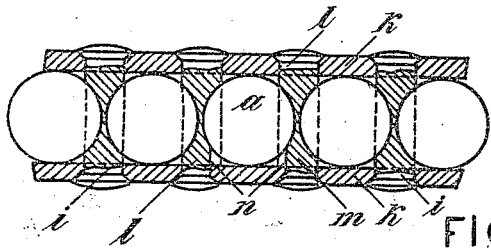 FIG.4. FIG.6. 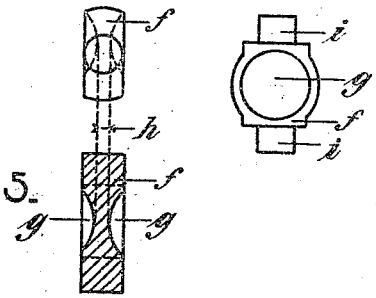
FIG.5.
Witnesses:
Hermann Barthel
Inventor.

UNITED STATES PATENT OFFICE.

HERMANN BARTHEL, OF SCHWEINFURT, GERMANY.

BALL-BEARING.

No. 856,209.　　　Specification of Letters Patent.　　　Patented June 11, 1907.

Application filed January 2, 1907. Serial No. 350,351.

*To all whom it may concern:*

Be it known that I, HERMANN BARTHEL, a subject of the German Emperor, and a resident of Schweinfurt, Germany, have invented certain new and useful Improvements in Ball-Bearings, of which the following is a specification.

This invention relates to improvements in ball-bearings, and more particularly to ring ball-bearings with ball races disposed vertically to the axle to be supported. For the bearing capacity of such ring ball-bearings the filling-up of the same with balls, is most essential. On the other hand, it is preferable to arrange intermediary pieces in order to avoid friction between each two adjacent balls. For preventing the balls from being shaken or forced sidewise and from breaking, together with the intermediary pieces, which occurs frequently, especially when the axle runs at high speed or is exposed to great strain and shocks, the arrangement of a rigid case of great resisting capacity for inclosing the balls and keeping them separate from each other, is absolutely necessary.

Now, the object of the present invention is to provide a rigid case of great resisting capacity, inclosing the balls and keeping them separate from each other, which allows of the ball-bearing being almost perfectly filled with balls.

The accompanying drawing shows a ring ball-bearing embodying the invention.

Figure 1 is a sectional elevation, and Fig. 2 a central vertical section, of the same; Fig. 3 shows part of the case in sectional development; while Figs. 4 to 6 are respectively a front view, a sectional plan, and a side view, of one of the intermediary pieces of the case.

The balls *a* are in the known manner for instance through the lateral fill-opening *b*, introduced into the races or grooves of the ring ball-bearing *d*, *e*. Between each two balls *a* an intermediary piece *f* is arranged and provided with cavities *g* shaped corresponding to the contours of the balls *a* which they are to receive so that the latter rest on a proportionately large surface whereby the intermediary pieces are little worn out by the rotation of the balls *a*.

On the adjacent tangent points of each two balls *a*, the intermediary pieces *f* possess their smallest wall thickness *h* while the latter increases toward all sides or directions so that, in spite of the small distance from ball to ball, the intermediary pieces *f* are very strong. On the outer faces of the intermediary pieces *f*, rivet-bolts *i* or other suitable connecting members are provided by means of which a rigid connection between the intermediary pieces *f* and two annuli *k* provided respectively at each face of the ball-bearing, is obtained to form a rigid case, after the bearing is filled with balls and intermediary pieces.

On account of the rivet-bolts *i* being provided at the strengthened outer faces of the intermediary pieces *f*, they can, in spite of the small distance between the balls, be made rather strong. Owing to the balls *a* resting only on smooth surfaces which are not weakened by the passage of screws, rivets or the like, the case and bearing cannot possibly break when exposed to high strain or to shocks. If the balls and intermediary pieces be arranged without any space whatsoever, the two intermediary pieces, say *l* and *m*, adjacent to the last introduced ball, may suitably be provided with two notches *n* corresponding to the surface of the ball (see Fig. 3).

Having fully described my invention, what I claim and desire to secure by Letters Patent is:—

A ring ball-bearing, comprising in combination with the ball-bearing proper (*d*, *e*) and balls (*a*) inserted in said ball-bearing, intermediary pieces (*f*) provided with cavities (*g*) shaped corresponding to the contours of the balls and arranged between each two balls so as to receive the latter in its cavities and to offer them a proportionately large supporting surface but to possess a very small wall thickness at the tangent points between each two balls and thus to present a very small distance from ball to ball, rivet-bolts (*i*) provided at the outer faces of said intermediary pieces, and annuli (*k*) disposed at the outer faces of said ball-bearing and adapted, after the bearing is filled with balls and intermediary pieces, to be connected with said rivet-bolts and thus to form together with said intermediary pieces a rigid case for the balls, substantially as described and shown.

In testimony whereof I have hereunto set my hand in the presence of two subscribing witnesses.

HERMANN BARTHEL.

Witnesses:
　CHRISTOPH SCHREIER,
　WILHELM WACKEN.